Oct. 21, 1924.
C. H. WHITE
DISK HARROW
1,512,257
Original Filed Sept. 11, 1920
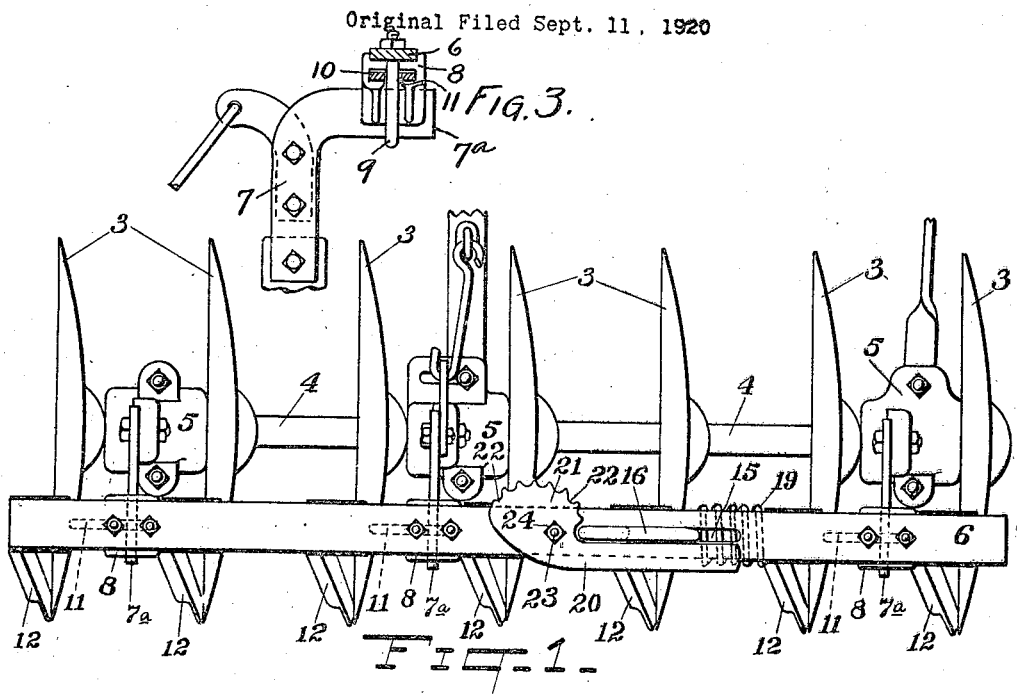
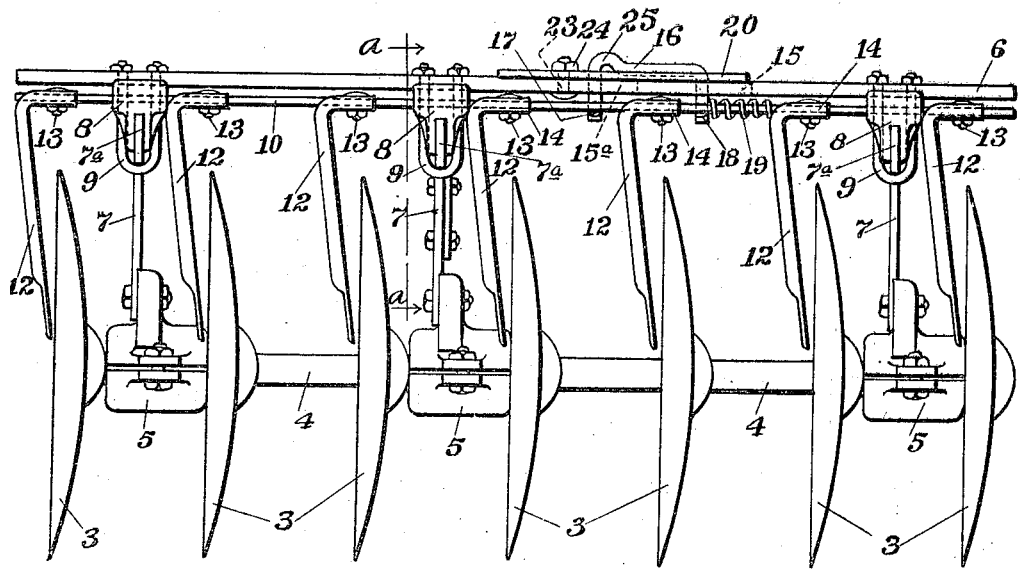
Inventor:
Charles H. White Patented Oct. 21, 1924.

1,512,257

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK HARROW.

Application filed September 11, 1920, Serial No. 409,633. Renewed March 22, 1924.

*To all whom it may concern:*

Be it known that I, CHARLES H. WHITE, a citizen of the United States, and a resident of Moline, in the county of Rock Island and State of Illinois, have invented certain new and useful Improvements in Disk Harrows, of which the following is a specification, reference being had to the accompanying drawings.

This invention relates to improvements in disk harrows, and particularly to the means for applying pressure to the scrapers provided for removing earth from the disks as they move over the ground. In the use of machines of this type the soil upon which the disks operate varies considerably in the amount of moisture that the soil may contain and also in the kind of soil. In some parts of a field the soil may be very sticky and in other parts very light, and thus the scrapers in order to remove the soil either have to bear quite hard upon the disks or may only have to bear lightly. It is the object of my invention to provide improved means whereby the pressure of the scrapers against the disks may be very easily and quickly adjusted by the operator of the harrow to suit various soil conditions, and also whereby the scrapers will be held out of operative position or in any operative position to which they may be adjusted. I accomplish this object as illustrated in the accompanying drawings and as hereinafter described. What I believe to be new is set forth in the claims.

In the accompanying drawings,—

Fig. 1 is a plan view of a portion of a disk harrow of well-known construction in which my improvements are embodied;

Fig. 2 is a rear elevation of the parts shown in Fig. 1; Fig. 3 is a sectional view taken on the line *a—a* of Fig. 2.

Referring to the drawings,—3 indicates disks of the usual type employed in harrows, having one surface concave and the other convex. These disks are mounted on an axle 4 which is suitably journaled in bearings contained in bearing boxes 5. A scraper frame bar 6 extends across the machine above the disks 3. Extending upwardly from the bearing boxes 5 are bars 7 which at their upper ends are provided with horizontal portions 7ª which engage with heavy blocks 8, as shown in Fig. 2. These blocks 8 are each provided with flanges on their upper ends which engage both edges of the bar 6. Each of the bars 7 is rigidly secured in place with reference to the frame bar 6 by a U-shaped bolt 9, the curved central portion of which lies under and engages the lower edge of the turned end member 7ª of the bar 7 and the two arms of which bolt lie against the end of a block 8. The ends of the U-shaped bolts are provided with nuts which, when tightened, clamp the scraper frame bar 6, the blocks 8 and the upwardly-extending rods 7 firmly together, as shown in Fig. 2.

Lying beneath the frame-bar 6 and supported by the several blocks 8 is a scraper-carrying bar 10. The blocks each have an opening therethrough of a shape and size to receive the bar 10 and allow such bar to be freely moved longitudinally. This bar 10 is provided with slots 11 through which the U-bolts pass, as shown in dotted lines in Fig. 1, and by reason of such slots the bar 10 is capable of being moved lengthwise as stated. Scrapers 12 are carried by the scraper-carrying bar 10 and secured thereto by means of bolts 13 and by lips 14 which engage the edges of the scraper-carrying bar 10. By this construction the scrapers are incapable of independent movement, but are adapted to move with the scraper-carrying bar 10.

The frame bar 6 is provided with two slots 15 and 15ª. A sliding bar 16 approximately in the form of a yoke, as shown in Fig. 2, is provided the downwardly-turned arms of which are adapted to pass through the slots 15 and 15ª, respectively, and engage the scraper-carrying bar 10 by fitting in holes formed therein. In the construction shown the two downwardly-turned end portions or arms of the slide or yoke 16 are secured in place in the scraper-carrying bar 10 by means of cotter pins 17 and 18, as shown in Fig. 2.

A spring (indicated by 19) is mounted on the scraper-carrying bar 10 so that one end abuts against a portion of one of the scrapers 12 and the other end abuts against that one of the downwardly-turned end portions of the slide or yoke 16 that will tend to normally cause the said yoke to move the various scrapers away from their respective disks. The pressure of the spring 19 thus tends to hold the slide or yoke 16 at the left hand end of the slots 15 and 15ª, as viewed in Fig. 2, in which position the scrapers 12 are free from engagement with the faces of the disks 3.

A lever 20 is provided, one end of which is enlarged to form a cam-shaped head 21 which is provided with a series of serrations or notches 22 in its edge. The lever 20 is suitably mounted and secured on the bar 6 by means of a bolt 23 and nut 24, and is adapted to swing upon such bolt as a fulcrum. As the lever is swung the notches are adapted to engage the adjacent downwardly-extending portion of the yoke 16 and force the bar 10 against the tension of the spring 19, such bar 10 carrying with it, of course, the scrapers 12 that are rigidly connected with it, whereby the scrapers are forced into contact with their respective disks 3. The scrapers 12 are held in their adjusted positions by the tension of the spring 19 which holds the yoke 14 in the selected notch of the lever 20. The yoke or bar 16 is provided with a hump or enlarged portion 25 at the upper end of the downwardly-turned arm that is engaged by the notched cam-shaped head of the lever so as to present a more extended bearing surface to the notches of said cam-shaped head. It will thus be seen that owing to the shape of the said notched head 21 of the lever 20 as various notches are swung into engagement with the yoke or slide 16 various degrees of pressure may be applied to the scraper-carrying bar, and to the scrapers attached thereto, thus forcing the scrapers against the disks with as much or as little pressure as may be desired according to the condition of the soil to be scraped off. It will be noted that this device is very easily operated, and the adjustment of the scraper bar and scrapers may be made very quickly and easily by the operator to meet varying soil conditions.

What I claim as my invention and desire to secure by Letters Patent, is—

1. An agricultural implement comprising in combination a gang of disks, two bars that are respectively fixed and longitudinally-movable relatively to each other, said disks being connected with said fixed bar, scrapers carried by said movable bar, a spring-pressed member slidingly supported upon said fixed bar and secured to said sliding bar, and a cam on said fixed bar adapted to be forced against said sliding member to compel an endwise movement of the said movable bar so as to carry the scrapers carried thereby toward or from the disks with which they respectively cooperate.

2. An agricultural implement comprising in combination a gang of disks, two bars that are respectively fixed and longitudinally-movable relatively to each other, said disks being connected with said fixed bar, scrapers carried by said movable bar, a member slidingly supported upon said fixed bar and having a portion extending through a slot in such bar and secured to said sliding bar, and a cam on said fixed bar adapted to be forced against said sliding member to compel an endwise movement of the said movable bar so as to carry the scrapers carried thereby toward or from the disks with which they respectively cooperate.

3. An agricultural implement comprising in combination a gang of disks, two bars that are respectively fixed and longitudinally-movable relatively to each other, said disks being connected with said fixed bar, scrapers carried by said movable bar, a member slidingly supported upon said fixed bar and having a portion extending through a slot in such bar and secured to said sliding bar, and a lever pivotally mounted on said fixed bar and having a cam-shaped head for engaging said slidingly-supported member to force it against the action of the said spring to compel a movement of said movable bar that will carry the scrapers against their respective disks.

4. An agricultural implement comprising in combination a gang of disks, two bars that are respectively fixed and longitudinally-movable relatively to each other, said disks being connected with said fixed bar, scrapers carried by said movable bar, a member slidingly-supported upon said fixed bar and secured to said movable bar, a spring acting against said slidingly-mounted member, and a lever having a cam-shaped head provided with a series of notches in its edge adapted by a turning of the lever to be successively brought into contact with said slidingly-supported member to force said member against the action of said spring in a direction to move the said movable bar to cause the scrapers carried thereby to bear against their respective disks.

5. An agricultural implement comprising in combination a gang of disks, two bars that are respectively fixed and longitudinally-movable relatively to each other, said disks being connected with said fixed bar, scrapers carried by said movable bar, a yoke-shaped member slidingly-supported upon said fixed bar and projecting through a slot in such bar and having its ends secured to said longitudinally-movable bar, a spring acting against said yoke-shaped member, and a lever having a cam-shaped head provided with a series of notches in its edge adapted by a turning of the lever to be successively brought into contact with one of the end portions of said yoke-shaped member to cause said member and the movable bar secured thereto to move against the action of the said spring in a direction to compel the scrapers to bear against their respective disks.

6. An agricultural implement comprising in combination a gang of disks, two bars that are respectively fixed and longitudinally-movable relatively to each other, said disks being connected with said fixed bar, scrapers carried by said movable bar, a yoke shaped member slidingly-supported upon said fixed bar and projecting through a slot in such bar and having its ends secured to said longitudinally-movable bar, a spring acting against said yoke-shaped member, and a lever having a cam-shaped head provided with a series of notches in its edge adapted by a turning of the lever to be successively brought into contact with one of the end portions of said yoke-shaped member to cause said member and the movable bar secured thereto to move against the action of the said spring in a direction to compel the scrapers to bear against their respective disks, said yoke-shaped member having that end portion that is engaged by the lever provided with a hump or enlargement to provide a bearing surface for engagement by the lever.

7. An agricultural implement comprising in combination a frame bar, a gang of disks connected rigidly to said bar, said connecting means comprising a series of blocks that engage said bar, a scraper-carrying bar supported by and longitudinally-movable on said blocks, a member slidingly-supported upon said frame bar and secured to said scraper-carrying bar, a spring acting against said slidingly-mounted member, and a lever pivotally mounted on said frame bar and having a cam-shaped head for engaging said slidingly-mounted member to force it against the action of said spring to compel a movement of said scraper-carrying bar.

8. An agricultural implement comprising in combination two bars one above the other, a plurality of blocks fixedly connected with the upper bar and having transverse openings therethrough through which the lower bar extends, a series of disks, an axle on which said disks are mounted, standards connecting said axle with said blocks, scrapers connected with said lower bar, and interengaging means carried by said two bars, respectively, for effecting a longitudinal movement of said lower bar.

9. An agricultural implement comprising in combination two bars one above the other, a plurality of blocks fixedly connected with the upper bar and having transverse openings therethrough through which the lower bar extends, a series of disks, an axle on which said disks are mounted, standards connecting said axle with said blocks, scrapers connected with said lower bar, and interengaging means carried by said two bars, respectively, for effecting a longitudinal movement of said lower bar, said means comprising a member secured to and projecting from the lower bar and a lever pivotally connected with the upper bar.

10. An agricultural implement comprising in combination two bars one above the other, a plurality of blocks fixedly connected with the upper bar and having transverse openings therethrough through which the lower bar extends, a series of disks, an axle on which said disks are mounted, standards connecting said axle with said blocks, scrapers connected with said lower bar, and interengaging means carried by said two bars, respectively, for effecting a longitudinal movement of said lower bar, said means comprising a member secured to said lower bar and projecting through a slot in the upper bar, and a lever pivotally connected with said upper bar.

11. An agricultural implement comprising in combination two bars one above the other, a plurality of blocks fixedly connected with the upper bar and having transverse openings therethrough through which the said lower bar extends, a series of disks, an axle on which said disks are mounted, standards extending between said axle and blocks, a single device for clamping each block to a standard and also clamping such block to said upper bar, and interengaging means carried by said two bars, respectively, for effecting a longitudinal movement of said lower bar.

12. An agricultural implement comprising in combination a frame bar, a gang of disks connected rigidly to said bar, said connecting means comprising a plurality of blocks that engage said bar, each block having a transverse opening therethrough, a longitudinally-movable scraper-carrying bar supported in said openings in the blocks, a member secured to and projecting from said scraper-carrying bar, and means carried by said frame bar for engaging said projecting member to cause a longitudinal movement of the scraper-carrying bar.

13. An agricultural implement comprising in combination a gang of disks, two bars that are respectively fixed and longitudinally movable relatively to each other, said disks being connected with said fixed bar, scrapers carried by said movable bar, a lever having a cam-shaped head pivotally mounted on one of said bars, said cam-shaped head being provided with a series of notches in its edge adapted by a turning of the lever to be successively brought into contact with an abutment carried by the other said bar to move the said movable bar to cause the scrapers carried thereby to bear against their respective disks.

14. An agricultural implement comprising in combination a gang of disks, two bars that are respectively fixed and longitudinally movable relatively to each other, said disks being connected with said fixed bar, scrapers carried by said movable bar, a lever having a cam shaped head pivotally mounted on one of said bars, an abutment carried by the other said bar, and a spring acting against said abutment, the cam-shaped head being provided with a series of notches in its edge adapted by a turning of the lever to be successively brought into contact with the abutment to force said abutment against the action of said spring in a direction to move the said movable bar to cause the scrapers carried thereby to bear against their respective disks.

CHARLES H. WHITE.